Dec. 31, 1935.  W. A. REICHEL  2,025,897

EARTH INDUCTOR COMPASS

Filed May 22, 1929  3 Sheets-Sheet 1

WITNESS
E. Lutz

INVENTOR
W. A. Reichel.
BY
A. B. Reavis
ATTORNEY

Dec. 31, 1935.  W. A. REICHEL  2,025,897
EARTH INDUCTOR COMPASS
Filed May 22, 1929   3 Sheets-Sheet 2

WITNESS
E. Lutz

INVENTOR
W. A. Reichel
BY
A. B. Reaves
ATTORNEY

Dec. 31, 1935. W. A. REICHEL 2,025,897
EARTH INDUCTOR COMPASS
Filed May 22, 1929 3 Sheets-Sheet 3

INVENTOR
W.A.Reichel.
BY
ATTORNEY

Patented Dec. 31, 1935

2,025,897

UNITED STATES PATENT OFFICE 2,025,897

EARTH INDUCTOR COMPASS

Wladimir A. Reichel, Philadelphia, Pa., assignor, by mesne assignments, to Pioneer Instrument Company, Inc., a corporation of New York Application May 22, 1929, Serial No. 364,999

29 Claims. (Cl. 33—204)

My invention relates to earth inductor compasses and it has for an object to provide apparatus of this character which has a high degree of reliability, which is accurate, and which may be easily maintained in operation.

Earth inductor compasses with which I am familiar resemble structurally direct current generators in that they embody brushes and commutators. Brushes and commutators are objectionable on account of wear, getting out of adjustment, becoming dirty, or getting out of order for any other reason; and, as the currents dealt with are very small, it will be apparent that these difficulties are serious ones leading to error or disability of the instrument. On the other hand, my improved compass resembles more an alternating current type of machine, in that commutators and brushes are not employed. Only one mechanically moving part, or rotor, is provided in my compass, and that part is a simple magnetically permeable one without a commutator, contacts, or windings.

More particularly, I employ pairs of magnetically permeable members, with an elongated permeable portion of the rotor arranged to rotate between the members of each pair in order to vary the magnetic resistance of the magnetic paths in a cyclic manner. The changes in magnetism, brought about by the changing magnetic resistance or reluctance of the permeable path, induce electromotive forces in windings associated with the permeable members of the pairs. Preferably, the pairs are arranged to define equal angles with the magnetic meridian, and the windings of the pairs are connected with first and second circuits whose potential difference is used to actuate a suitable indicator. It is, therefore, a further object of my invention to provide apparatus of this character which is mechanically simple and in which brushes and contacts or commutators are avoided.

A further object of my invention is to provide circuit apparatus of the above character with suitable amplifying and rectifying apparatus to operate an indicator in a sensitive and accurate manner.

These and other objects are effected by my invention as will be apparent from the following description and claims taken in connection with the accompanying drawings, forming a part of this application, in which:

Figure 1:
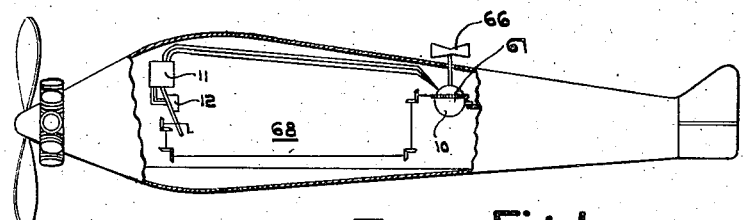
Fig. 1 is a diagrammatic view showing the invention applied to an aeroplane.

Referring to Fig. 1, I show my invention applied to aircraft, for example, an aeroplane. In this view, I show a compass organization including the directive generator 10, an amplifier and rectifier at 11, and an indicating instrument at 12. The generator is driven in any suitable manner, as by an air turbine. The generator utilizes the earth's magnetic field to generate a potential which increases as the permeable members approach the magnetic meridian and which decreases with recession thereof from the meridian. This changing potential secured in this way is used to operate the indicating apparatus.

Figure 4:
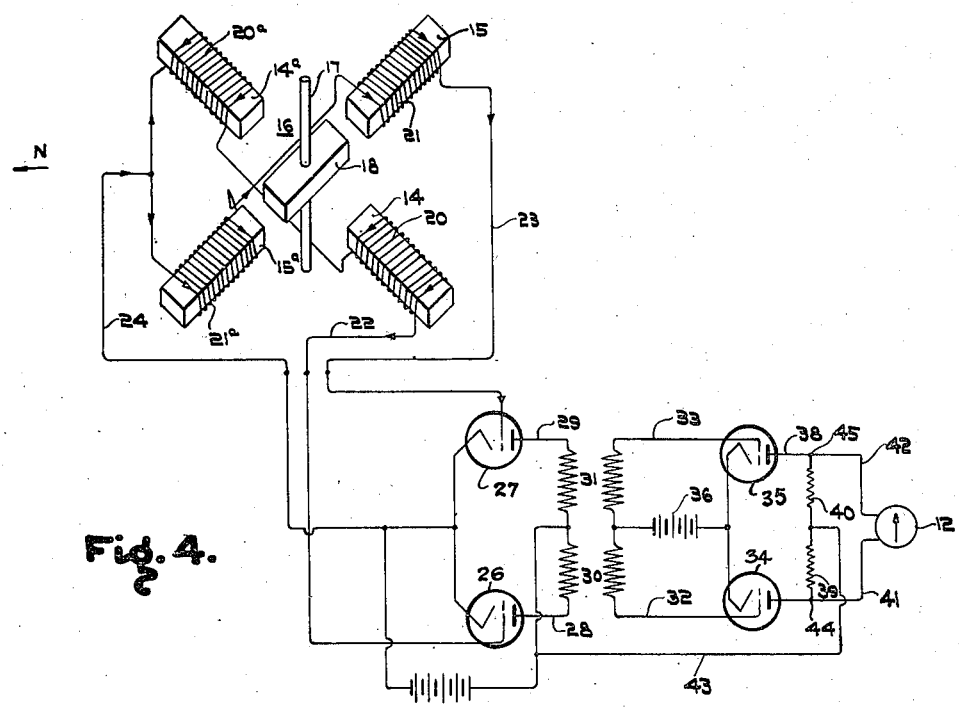
Figs. 4 and 5 are diagrammatic views illustrating operating principles of the invention; and, Figs. 6 to 9, inclusive, are diagrammatic views of modified forms.

Referring now to the generator 10 more in detail, this preferably comprises two pairs of highly permeable members 14, 14a and 15, 15a, preferably made of "Hypernick". The pairs are arranged at right angles to each other, and the inner ends of the members of the pairs are spaced substantially the same distance from the axis of the rotor 16 embodying a spindle 17 and a highly permeable elongated portion 18 also preferably made of "Hypernick" arranged to have its ends pass contiguously by the opposed inner ends of the members 14, 14a and 15, 15a. In Fig. 4, the member 18 is defining minimum air gaps with the members 15, 15a, and, therefore, the permeability of the aggregate consisting of the members 15, 15a and 18 is a maximum and the magnetic resistance, or reluctance, is a minimum. When the minor transverse axis of the member 18 is in line with the members of a pair, as it is with respect to the members 14, 14a, the permeability is at a minimum and the reluctance or magnetic resistance is at a maximum. If the pairs of members 14, 14a and 15, 15a are placed so as to have a magnetic meridian component of direction, such members and the rotor member 18 become permeable paths for earth's magnetism, and the cyclic variation in magnetic resistance of each pair and rotor aggregate results in a cyclically varying field of magnetism, the number of lines being a minimum, or a weak field existing, when the reluctance is greatest and vice versa. If a conductor, or winding, is suitably related to a member whose magnetism is varying a potential will be induced in the conductor.

In Fig. 4, I show windings 20, 20a disposed about the members 14, 14a and windings 21, 21a disposed about the members 15, 15a. The windings 20 and 20a are connected in series and the same is true of the windings 21 and 21a. The windings 20 and 21 are connected to leads 22 and 23, respectively, and the windings 20a and 21a are preferably connected to a common lead 24. Therefore, there is provided a circuit for each pair of members 14, 14a and 15, 15a and associated windings 20, 20a and 21, 21a, the circuit for the first pair including the leads 22 and 24 and that for the second pair including the leads 23 and 24. Assuming that the pairs of permeable members 14, 14a and 15, 15a are disposed so as to have a component of magnetic meridian direction, then, with rotation of the member 18, a cyclically varying potential will be set up in each circuit.

If the cruciform arrangement of permeable members is set so that the magnetic meridian bisects the angle therebetween, for example, the angle between 14 and 15 and between 14a and 15a, and if the circuits including the windings 20, 20a and 21, 21a are electrically alike, then the potentials of the two circuits will be the same; however, if the apparatus is turned so that one pair of members 14, 14a, or 15, 15a is closer to the magnetic meridian than the other, a higher potential will result in the circuit for the nearer members and a weaker potential will result in the circuit for the more remote members. Therefore, if indicating means responsive to potential difference in the circuits is employed, a directive organization results. Assuming a course is determined and the pairs of members 14, 14a and 15, 15a are set to define equal angles with the magnetic meridian, the indicator reading will be the proper one for the course, any departure from the course resulting in a change in the indicator reading.

The leads 22, 23 and 24 preferably go to suitable amplifying and rectifying apparatus 11 for operating the indicator 12. The lead 22 is connected to the grid of a three-element, or vacuum, tube 26, the lead 23 is connected to the grid of the tube 27 and the lead 24 is connected to the filament, or —B, side. The output, or plate, leads 28 and 29 are connected to primaries of transformers 30 and 31, whose secondaries are connected to grid leads 32 and 33 of rectifier tubes 34 and 35, the grids of the latter tubes being suitably biased by a "C" battery 36. The output or plate leads 37 and 38 have parallel connections provided by the series resistances 39 and 40 and by the leads 41 and 42 and the included milammeter 12.

A "B" battery connection 43 is connected between the resistances 39 and 40. As long as the IR drops of the resistances 39 and 40 are alike and the E. M. F.'s of the pairs of coils are the same, the reading of the meter 12 does not change, for example, it stays at "0"; however, as soon as a change in IR drop occurs in the resistances due to a potential difference in the pairs of coils and circuits following from departure of the coils from the symmetrical position on opposite sides of the meridian, deflection of the instrument takes place. In other words, as long as the potentials at 44 and 45 are the same, no current will pass through the leads 41 and 42 and the meter 12.

From the foregoing, it will be apparent that deflection of the meter 12 results from potential difference in circuits including the respective pairs of coils, and it is for this reason that two pairs of permeable members and coils are used. With this arrangement, a desired course may be followed with coils properly located with respect to the meridian and the meter reading zero.

Furthermore, since the ammeter is operated by a bridge arrangement such as described, speed variations of the generator do not affect the practical accuracy of the apparatus.

Figure 5:
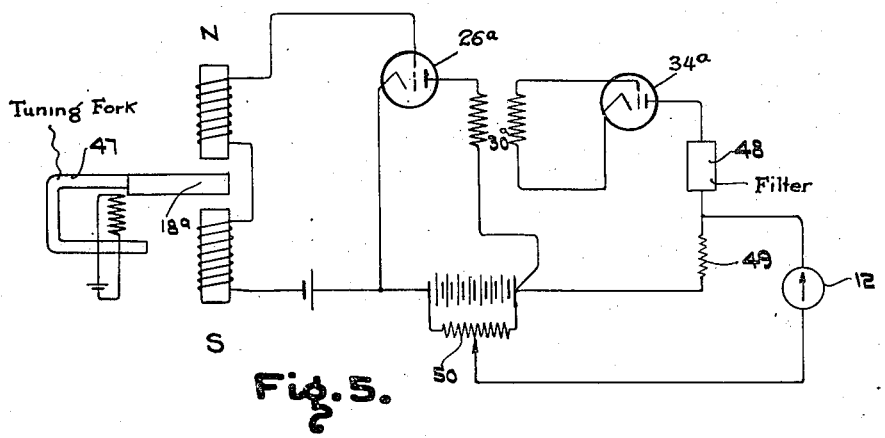

It is possible to employ only one permeable path, in which case there would be a single circuit of fluctuating E. M. F. which is at a maximum when the permeable members are in the meridian and which weakens as the meridian is departed from. The variability of potential, this being dependent upon departure from the meridian, may be used to operate a suitable meter or indicator. The output from a single pair of coils may be amplified, rectified and applied to an indicator in any suitable manner. An arrangement of apparatus for operation in this way is diagrammatically illustrated in Fig. 5.

Where a single pair of permeable members is employed it is essential that the movement resulting in cyclic change in resistance shall be of constant speed. Therefore, in Fig. 5, the movable permeable member 18a is provided on a tuning fork 47. The grid circuit of the tube 26a, as before, includes the windings of the permeable members. The output from the tube 26a is transformed by the transformer 30a and applied to the grid of the rectifier tube 34a. A filter 48 and a resistance 49 are arranged in the plate circuit of the tube 34a. The meter 12 is connected to the plate lead between the filter 48 and the resistance 49 and to the potentiometer 50. With the permeable members and their windings in the meridian and the tuning fork operating, the potentiometer is adjusted, the IR drop across the resistance 49 is balanced with the IR drop across the potentiometer 50 so as to obtain zero reading of the instrument 12. Then any deviation from the magnetic meridian will result in change of IR drop across resistance 49 and a change of indication, providing the speed of the tuning fork remains constant. It is to be understood, of course, that a rotor may be used instead of the tuning fork if rotated at constant speed.

Figure 2:
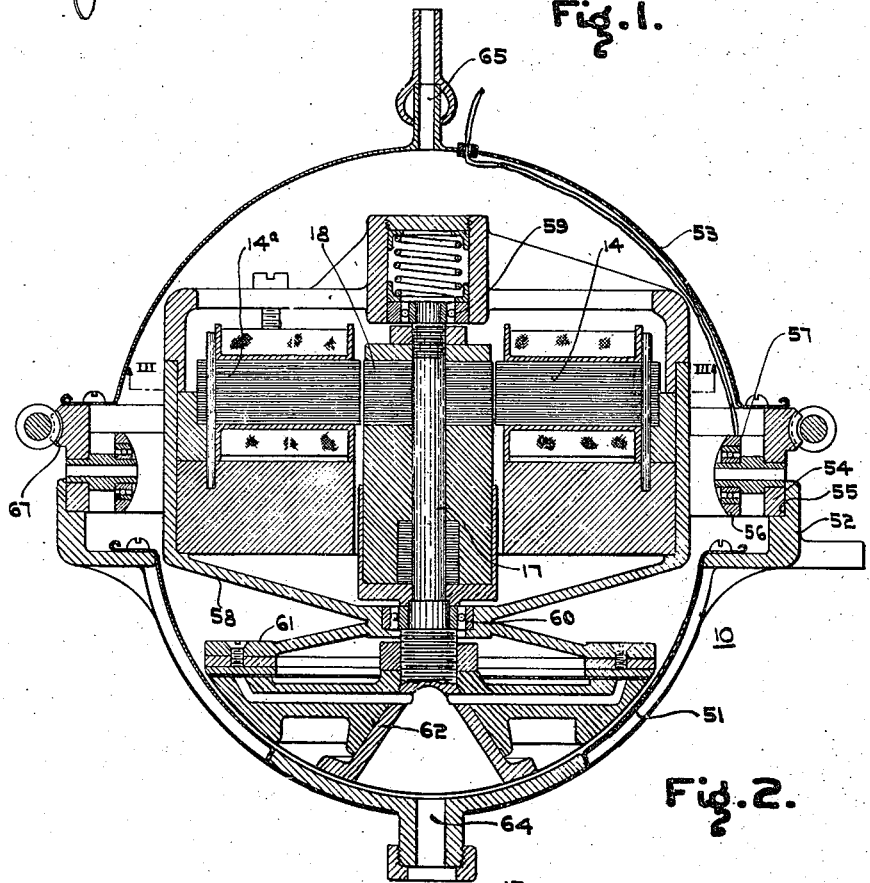
Fig. 2 is a vertical sectional view of the generator and its operating turbine.
Figure 3:
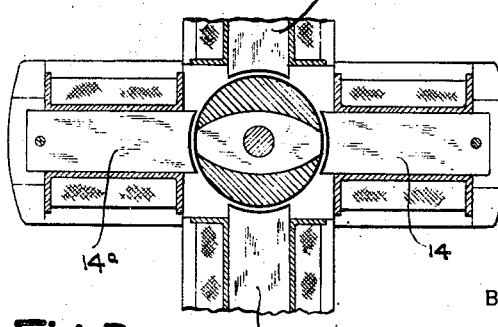
Fig. 3 is a detail sectional view taken along the line III—III of Fig. 2.

Referring now to Figs. 2 and 3, the pairs of permeable members 14, 14a and 15, 15a, the windings 20, 20a and 21, 21a as well as the rotor 16, are enclosed by a suitable casing made up of a supporting lower half 51 having a supporting portion 52 and an upper half 53 having a ring 54 fitting the annular seat 55 of the lower half so that the upper half may be adjusted about the vertical. The interior working parts are supported from the ring 54 by a gimbal mounting, the latter including a ring 56 pivoted at 57 with respect to the housing and having pivots at right angles thereto for supporting the stator and rotor structure.

The stator structure embodies a suitable frame 58 which carries the pairs of permeable members 14, 14a and 15, 15a, the coils therefor, and the rotor 16 having the permeable elongated portion 18. The rotor is supported from the frame 56 by suitable bearings 59 and 60. Below the frame 58, there is provided an air turbine embodying stator structure 61 carried by the frame 58 and a rotor 62 connected to the spindle 17.

The gimbal support together with the pendulous form of stator and rotor structure makes possible, due to the gyroscopic effect, the maintenance of the level position of the stator and rotor structure. The air turbine is operated by a current of air entering the inlet port 64, such air gives up velocity energy to the turbine elements, resulting in rotary motion of the rotor 16 and it is exhausted through the suction outlet 65, sub-atmospheric pressure being maintained at the outlet 65 and in the casing by well-known Venturi apparatus at 66.

In order that the stator structure may be adjusted about the vertical, to bring the permeable members and coils in to proper position with respect to the craft, I show the upper casing half, provided with a gear 67 operated by suitable adjusting mechanism 68 (Fig. 1).

The apparatus described is operated as follows: The rotary support, or turntable, 54 is adjusted angularly about the vertical to bring the permeable members into proper position, for the selected course; and, as long as the course is not deviated from the reading of the instrument, for example zero, will not change. As soon as the aircraft is in motion, the venturi induces a flow of air through the turbine to turn the permeable member 18, whereupon potentials in the two circuits are developed; and, as long as the fixed permeable members are not turned in the earth's magnetic field and such members are maintained in their correct positions relatively to the meridian, the potentials are equal and the indicator remains in its position; however, with turning of such members, the potential of one circuit is greater than that of the other and the indicator moves accordingly.

While I prefer to use two permeable paths for earth's magnetism, it will be apparent that the operation and effect of each are identical. Two paths spaced angularly make possible the two circuits and the use of a sensitive bridge method to determine deviation. So far as my invention is concerned, in its broader aspects, I may use, a single permeable path with suitable indicating means.

While the apparatus described is suitable in following a predetermined course, it is desirable to associate means providing a field which assists or resists the earth's field dependent upon the position in azimuth of the apparatus, otherwise the compass may become ambiguous upon a predetermined angle of departure. For example, with the form shown in Fig. 1, the same indications would be repeated for each 90°, and, in the form shown in Fig. 5, there would be repetition each 180°, with the result that the navigator would not know if he was traveling north, south, east, or west with the apparatus of Fig. 1 or north or south with Fig. 5.

Figure 6:
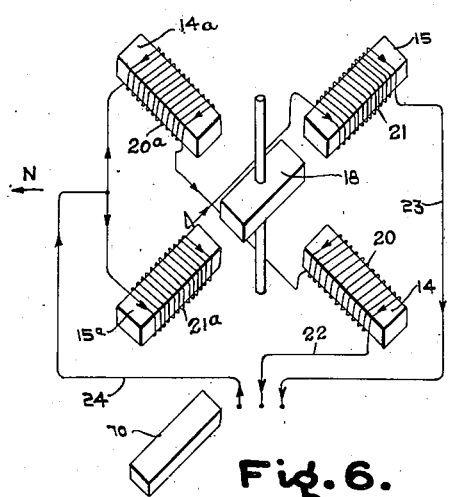
Figure 7:
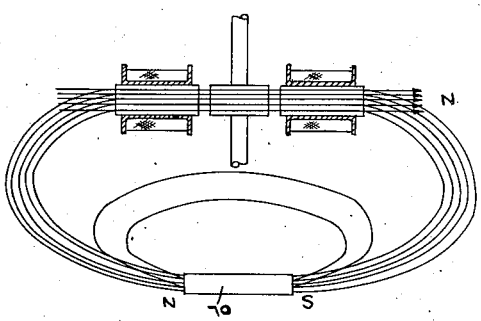

Any suitable means may be used to give a field which is fixed with respect to the stator permeable members. In Figs. 6 and 7, a magnet is employed for this purpose; in Fig. 8, separate windings energized from a suitable source of E. M. F. are used to provide a similar field; and, in Fig. 9, the main windings and the biasing "C" battery are used to obtain the fixed field.

Referring to Figs. 6 and 7, I show a fixed magnet 70 so disposed relatively to the stator permeable members that its field assists the earth's field at a maximum when the azimuthal position is north and resists such field to a maximum when such position is south. The effect of this fixed field of the magnet is to avoid the ambiguity pointed out on account of the larger potential generated when the field of the magnet is in assisting position, the variation in potential difference being indicated on the milammeter, with the result that the navigator, after a wide departure, can turn until the north quadrant, for example, that between the permeable members 14a and 15a, is brought back pointing toward the north.

Figure 8:
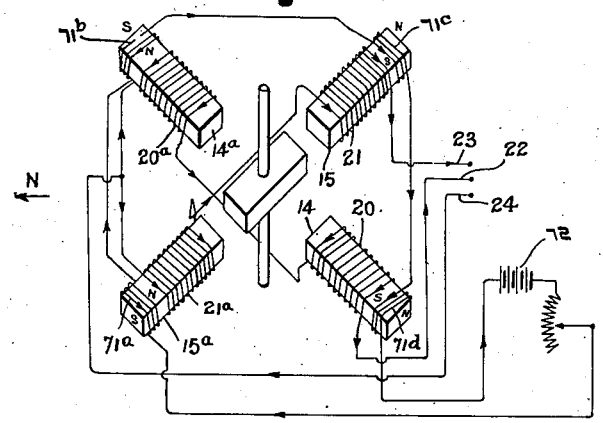

In Fig. 8, separate windings 71a, 71b, 71c and 71d are arranged on the permeable members 14a, 15, 14 and 15a, respectively and excited from a suitable source of E. M. F. such as a battery 72, the fixed field set up by the windings being utilized to assist or to resist the earth's field for the purpose already described. Current passing through the windings 71a, 71b, 71c and 71d of Fig. 8 produces the same effect as the permanent magnet 70 in Fig. 6. The windings are so disposed and the direction of current flow is such that the windings have "N" and "S" poles as indicated. If the quadrant between the permeable members 14a and 15a is pointed north, the resultant of the earth's field and that of the windings will be a maximum, causing maximum flux in the pairs of permeable members; if either the quadrant between 14a and 15 or 14 and 15a is pointed north, the resultant field is less; and, if the quadrant between 14 and 15 is pointed north, the resultant field and flux is a minimum. If the navigator should depart from his course too widely, for example, if a turn is made such that the quadrant between 14a and 15a is no longer directed north, he can by turning his craft observe the deflections of the milammeter and when the maximum range of deflection is reached he knows that the quadrant between 14a and 15a is pointing north, for then maximum E. M. F.'s will be generated and consequently the maximum potential differences in the circuits will occur.

Figure 9:
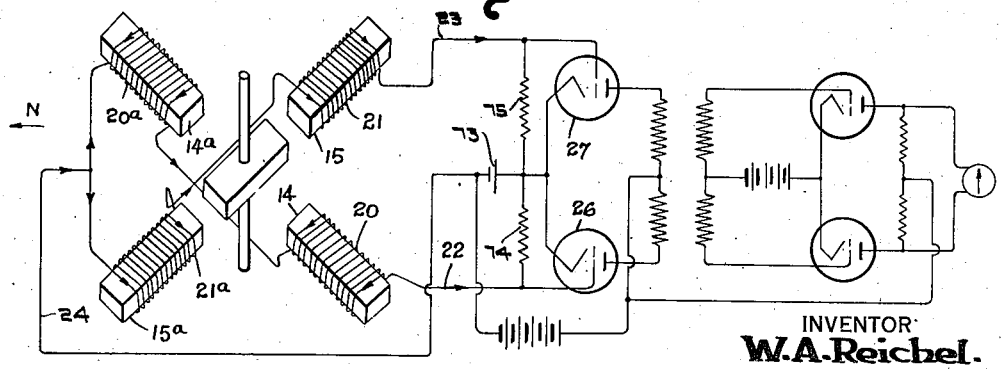

In Fig. 9, the biasing "C" battery 73 for the grids of the amplifier tubes 26 and 27 is connected by high resistances or grid leaks 74 and 75 to the output leads 22 and 23 of the windings with the result that the "C" battery is a source of E. M. F. for the main windings setting up an assisting or resisting field as pointed out. Direct current passing from the "C" battery through the conductor 24 divides, one part passing through the windings 20a and 20 and returning to the "C" battery through the lead 22 and the grid leak or resistance 74 and the other part passing through the windings 21a, 21, the lead 23 and the resistance 75 to the battery. Current, in so passing, causes the main or generator windings to develop fields, the south pole ends of 20a and 21a being outward and of 20 and 21 being inward and the north pole ends of 20a and 21a being inward and of 20 and 21 being outward. Hence, the "C" battery current in passing through the main windings produces a field which assists the earth's field when the quadrant between 15a and 14a is directed north and which opposes the earth's field to a maximum when the quadrant between 14 and 15 is pointed north, the principle or mode of overcoming ambiguity being the same as in Fig. 8.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In apparatus of the character described, the combination of means providing a permeable path for earth's magnetism and including rotatable permeable means interposed in said path for cyclically varying the magnetic resistance of said path, and circuit means including windings arranged in inductive relation with respect to said permeable path.

2. In apparatus of the character described, the combination of a first support, a second support angularly adjustable relatively to the first support, means carried by the second support providing a permeable path for earth's magnetism and including a permeable part which is rotatable in said path for cyclically varying the magnetic resistance of said path, and circuit means including windings arranged in inductive relation with respect to the portion of said permeable means fixed to said second support.

3. In apparatus of the character described, the combination of means providing a path permeable to earth's magnetism and including spaced magnetically permeable members and an intermediate magnetically permeable member interposed in said path and rotatable with respect to the first members so as to cyclically vary the reluctance of the magnetic path provided by said members, and circuit means including windings arranged in inductive relation to the first members.

4. In apparatus of the character described, the combination of first and second relatively angularly disposed pairs of alined and magnetically permeable members, the members of each pair being spaced apart, a magnetically permeable and elongated rotor arranged in the space between the members of the pairs, and output circuit means including windings surrounding the members of the pairs.

5. In apparatus of the character described, the combination of a cruciform arrangement of magnetically permeable members defining a central space, a magnetically permeable and elongated rotor arranged in said space, and output circuit means including windings surrounding the first members.

6. In apparatus of the character described, the combination of a horizontal turntable adjustable about a substantially vertical axis, spaced and elongated members permeable to earth's magnetism and carried by the turntable, a member arranged in the space between the first members and rotatable to cyclically vary the reluctance of the magnetic path afforded by said members, and output circuit means including windings disposed about the first members.

7. In apparatus of the character described, the combination of a rotor providing an elongated magnetically permeable path, four angularly equidistantly spaced magnetically permeable members disposed radially with respect to the axis of said rotor and having their inner ends substantially equidistantly spaced from said rotor axis and arranged to define closer clearances with respect to the opposed ends of said elongated magnetically permeable path portion of said rotor than with respect to other portions thereof, and output circuit means including windings surrounding the radially disposed members.

8. In apparatus of the character described, the combination of first and second pairs of alined magnetically permeable members, the inner ends of the members of each pair being spaced apart, a rotor having an elongated magnetically permeable portion rotatable in the space between the inner ends of the members of the first and second pairs, windings for the members of the first and second pairs, and an indicator responsive to the potential difference developed in the first and second pair windings.

9. In apparatus of the character described, the combination of a first pair of alined magnetically permeable members, a second pair of magnetically permeable members arranged at right angles to the first pair, the inner ends of the members of each pair being spaced apart, a rotor having an elongated magnetically permeable portion rotatable in the space between the inner ends of the members of the first and second pairs, windings for the members of the first and second pairs, and an indicator responsive to the potential difference developed in the first and second pair windings.

10. In apparatus of the character described, the combination of a first pair of magnetically permeable members, a second pair of magnetically permeable members arranged at an angle with respect to the first pair, the inner ends of the members of each pair being spaced apart, a rotor having an elongated magnetically permeable portion rotatable in the space between the inner ends of the members of the first and second pairs, windings for the members of the first and second pairs and connected in series, leads connected to the end windings of the series and on adjoining members of the first and second pairs, a pair of three element vacuum tubes having their grids connected to the respective end winding leads, transformers arranged in the respective output circuits of said tubes, a pair of rectifier tubes having the grids thereof connected to the secondaries of the respective transformers, and an indicator operated in response to output difference of the rectifier tubes.

11. In apparatus of the character described, the combination of an angularly adjustable substantially horizontal turntable, a first pair of magnetically permeable members, a second pair of magnetically permeable members arranged at right angles with respect to the first pair, the inner ends of the members of each pair being spaced apart, a rotor having an elongated magnetically permeable portion rotatable in the space between the inner ends of the members of the first and second pairs, windings for the members of the first and second pairs and connected in series, leads connected to the end windings of the series and on adjoining members of the first and second pairs, a pair of three element vacuum tubes having their grids connected to the respective end winding leads, transformers arranged in the respective output circuits of said tubes, a pair of rectifier tubes having the grids thereof connected to the secondaries of the respective transformers, and an indicator operated in response to output difference of the rectifier tubes.

12. In an inductor compass, the combination of a first pair of magnetically permeable members, a second pair of magnetically permeable members disposed angularly with respect to the first pair, said pairs of magnetically permeable members being adapted to be arranged so that the meridian bisects the angle therebetween, a rotor having an elongated magnetically permeable portion having its outer ends adapted to move by the inner ends of said members of the pairs, whereby the magnetic resistance of the members of each pair and the intervening magnetically permeable portion is successively increased and diminished, separate circuits having windings for the members of the respective pairs, and indicating means responsive to the potential difference of said circuits.

13. In an inductor compass, the combination of a first pair of magnetically permeable members, a second pair of magnetically permeable members arranged at right angles to the first pair, said pairs of magnetically permeable members being adapted to be arranged so that the meridian bisects the angle therebetween, a rotor having an elongated magnetically permeable portion having its outer ends adapted to move by the inner ends of said members of the pairs, whereby the magnetic resistance of the members of each pair and the intervening magnetically permeable portion is successively increased and diminished, windings arranged in inductive relation to the members of said pairs and connected in series, two circuits including the windings of the respective pairs, and leads connected to the northwest and northeast windings and a common lead connected between the southwest and southeast windings, and indicating means responsive to the potential difference of said circuits.

14. In an earth inductor compass, the combination of a two-circuit generator embodying first and second pairs of magnetically permeable members, a rotor having an elongated magnetically permeable portion arranged between the members of each pair, windings for the members of said pairs, and first and second circuits including the windings of the members of the first and second pairs, respectively, and an indicator responsive to the potential difference of said first and second circuits.

15. In an earth inductor compass, the combination of a two-circuit generator embodying a first pair of magnetically permeable members and a second pair of magnetically permeable members arranged at right angles to the first pair, a rotor having an elongated magnetically permeable portion arranged between the members of said pairs, windings for the members of the pairs, and first and second circuits including the windings of the respective pairs; means providing for setting of said members so that the axes of the first and second pairs define equal angles with the meridian; and an indicator responsive to the potential difference of said first and second circuits.

16. In an inductor compass, a casing having an air inlet and an air outlet, a two-circuit generator utilizing the earth's magnetism as its field and arranged in said casing, said generator including normally stationary first and second pairs of magnetically permeable elements and a rotatable magnetically permeable element and windings disposed in inductive relation with respect to the normally stationary elements, indicating means responsive to the potential difference of the circuits, an air turbine connected to the rotor and arranged to receive air from the inlet and to exhaust air interiorly of said casing, and means for creating a subatmospheric pressure at the outlet to induce the passage of air through the inlet and the turbine.

17. In apparatus of the character described, an elongated magnetically permeable rotor, four angularly spaced and relatively fixed magnetically permeable members disposed radially with respect to said rotor and having their inner ends substantially equidistantly spaced from said rotor, first and second pairs of series windings disposed about opposed radial members, first and second circuits including the first and second pairs of windings, respectively, and having a common return, and indicating means responsive to the potential difference of said circuits.

18. In an earth inductor compass, the combination of relatively fixed but angularly adjustable means providing a permeable path for the earth's magnetism and including rotatable permeable means for varying the magnetic flux of said path, means in inductive relation with said path for deriving an electric potential which is produced by the variation of the magnetic flux of said path, and means associated with said last mentioned means for indicating said potential.

19. In an earth inductor compass, the combination of a relatively fixed support which is angularly adjustable in azimuth with respect to the direction of the earth's magnetic field, means fixed to and adjustable with said support and providing a permeable path for the earth's magnetism and including a permeable part which is rotatable in said path for periodically varying the magnetic flux of said path, circuit means including inductive means arranged in inductive relation with said permeable path for deriving an electric potential which is produced by the variation of the magnetic flux of said path, and means associated with said circuit means for indicating said potential.

20. In an inductor compass of the type utilizing members highly permeable to the earth's magnetic field providing a permeable path for the latter, means providing a fixed field for the members and which opposes or assists the earth's field dependent upon the azimuthal position of the members and the fixed field, whereby the compass may serve to indicate the true direction of travel, and a permeable rotor between the first-mentioned permeable members for varying the reluctance of said path.

21. In an inductor compass, the combination of a stator structure embodying spaced relatively fixed but angularly adjustable permeable members, providing a permeable path for the earth's field, a rotor structure embodying an elongated permeable member disposed between the stator permeable members for varying the reluctance of said path, windings having output leads and arranged in inductive relation with respect to the stator permeable members whereby current is induced therein upon operation of the rotor, and means providing a field for said permeable members and whose direction is fixed relatively thereto.

22. In an inductor compass of the type including a plurality of members highly permeable to the earth's magnetic field for receiving a magnetic flux from the latter, a winding on each of said members and in which a current is induced by variation of the magnetic flux in said members, and an indicator responsive to the currents in said windings, the combination of an auxiliary winding for and associated with each of said first windings, and a source of electric current for energizing said auxiliary windings whereby the flux produced by said auxiliary windings cooperates with the flux produced in said permeable members by the earth's field to prevent said indicator from producing ambiguous indications for positions 180° apart.

23. In an inductor compass, a plurality of members highly permeable to the earth's magnetic field for concentrating the flux from said field, a winding on each member for producing additional fluxes in said members, means for producing cyclic changes in said fluxes, a second winding on each member and adapted to have induced therein an E. M. F. proportional to said changing fluxes, electrical indicating means, and circuit means connecting said windings to said indicating means whereby the latter indicates the relative concentration of flux from the earth's field in said members and hence the direction of said field with respect to said members.

24. In an inductor compass, a plurality of members highly permeable to the earth's magnetic field for concentrating the flux from said field, a winding on each member for producing additional fluxes in said members, means for producing cyclic changes in said fluxes, a second winding on each member and adapted to have induced therein an E. M. F. proportional to said changing fluxes, electro-responsive means, and circuit means connecting said second windings to said electro-responsive means whereby the latter operates in accordance with the relative concentration of flux from the earth's field in said members and hence in accordance with changes in the relative direction between said field and said members.

25. An electromagnetic compass comprising an armature arranged for rotation in the earth's magnetic field, a magnetic member having relatively high permeability and relatively low retentivity, and means mounting said member in cooperative relationship with said armature so that said member directs the earth's magnetic field into said armature, means for mounting said member on a craft subject to motion about an axis thereof, and means for stabilizing said magnetic member in a predetermined plane whereby said member is stabilized about said axis.

26. An electromagnetic compass comprising an armature, means for rotating said armature, a magnetic member, means mounting said member in cooperative relationship with said armature so that said member directs into said armature a magnetic flux determined by the angular relationship between an axis of said member and an axis of a component of the earth's magnetic field, and said member including a magnetic structure mounted in cooperative relationship with said armature and surrounding a substantial portion thereof for shielding said armature from other components of the earth's magnetic field.

27. An electromagnetic compass for an aircraft and the like comprising an armature, means mounting said armature on said craft for rotation about a normally vertical axis, a pair of magnetic members arranged on opposite sides of said armature and extending in opposite directions therefrom, means mounting said members in a horizontal plane with an end of each adjacent said armature so that said members direct the earth's magnetic field into said armature, and manually operated means for rotating said members in said horizontal plane to a desired position with respect to a predetermined axis of said craft.

28. An electromagnetic compass comprising an armature, means for rotating said armature, means including a pair of elongated magnetic members arranged end to end on opposite sides of said armature for controlling the effect of the earth's magnetic field on said armature, and means for stabilizing said members in a predetermined plane.

29. An electromagnetic instrument comprising an armature, a support for said armature, means for rotating said armature, means including a pair of elongated magnetic members adjustably mounted on said support in alinement for directing the earth's magnetic field into said armature, and means for maintaining said magnetic members in a horizontal plane.

WLADIMIR A. REICHEL.